US009152359B2

(12) United States Patent
Hontsu et al.

(10) Patent No.: US 9,152,359 B2
(45) Date of Patent: Oct. 6, 2015

(54) IMAGE FORMING APPARATUS THAT SELECTS APPROPRIATE POWER SAVING MODE FOR EACH TIME SLOT

(71) Applicant: Kyocera Document Solutions Inc., Osaka (JP)

(72) Inventors: Ayaka Hontsu, Osaka (JP); Nobuhiro Hara, Osaka (JP); Yumi Nakagoshi, Osaka (JP); Hiroshi Nakamura, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/583,207

(22) Filed: Dec. 26, 2014

(65) Prior Publication Data

US 2015/0186080 A1 Jul. 2, 2015

(30) Foreign Application Priority Data

Dec. 27, 2013 (JP) ................................. 2013-271378

(51) Int. Cl.
*G06F 3/12* (2006.01)
(52) U.S. Cl.
CPC ............ *G06F 3/1221* (2013.01); *G06F 3/1273* (2013.01)
(58) Field of Classification Search
CPC ........................... G06F 3/1221; G06F 3/1273
See application file for complete search history.

(56) References Cited

U.S. PATENT DOCUMENTS

| 8,693,024 | B2* | 4/2014 | Sano | 358/1.14 |
| 2007/0059014 | A1* | 3/2007 | Oka | 399/79 |
| 2007/0236725 | A1* | 10/2007 | Harmon et al. | 358/1.15 |
| 2011/0231026 | A1* | 9/2011 | Yaoyama | 700/291 |
| 2011/0255129 | A1* | 10/2011 | Tamura | 358/1.15 |
| 2012/0155945 | A1* | 6/2012 | Ogushi | 400/76 |
| 2013/0135659 | A1* | 5/2013 | Ebi et al. | 358/1.14 |

FOREIGN PATENT DOCUMENTS

| JP | 2004-062405 A | 2/2004 |
| JP | 2007-030325 A | 2/2007 |

* cited by examiner

*Primary Examiner* — Benny Q Tieu
*Assistant Examiner* — Quyen V Ngo
(74) *Attorney, Agent, or Firm* — James W. Judge

(57) ABSTRACT

An image forming apparatus includes an operation panel, a printing device, a storage device, a job management unit, a power-saving mode setting unit, and an operation mode control unit. The power-saving mode setting unit that: (a) specifies the job log where the start time point of the job execution belongs to an identical time slot in a past for a predetermined time slot; and (b1) sets the power-saving mode for the predetermined time slot to the first power-saving mode when a proportion of the number of the executing jobs where the job types of the specified job log belong to the first job type group to the number of the executing jobs where the job types of the specified job log belong to the first job type group or the second job type group exceeds a predetermined threshold value.

7 Claims, 4 Drawing Sheets

FIG. 2

| Job Type Specified As Low Electric Power Mode | Job Type Specified As Sleep Mode |
|---|---|
| Copying | Printing |
| Host Transmission (e-mail, SMB, FTP) | Box Storage |
| Facsimile Transmission | Facsimile Reception |
| Box Printing | |

FIG. 4

| Job Type Specified As Low Electric Power Mode | Job Type Specified As Sleep Mode |
|---|---|
| Copying<br><br>Host Transmission<br>(e-mail, SMB, FTP)<br><br>Box Storage<br><br>Box Printing | Printing<br><br>Facsimile Transmission<br><br>Facsimile Reception |

IMAGE FORMING APPARATUS THAT SELECTS APPROPRIATE POWER SAVING MODE FOR EACH TIME SLOT

INCORPORATION BY REFERENCE

This application is based upon, and claims the benefit of priority from, corresponding Japanese Patent Application No. 2013-271378 filed in the Japan Patent Office on Dec. 27, 2013, the entire contents of which are incorporated herein by reference.

BACKGROUND

Unless otherwise indicated herein, the description in this section is not prior art to the claims in this application and is not admitted to be prior art by inclusion in this section.

One power-saving control unit automatically controls a reference elapsed time for causing itself to switch from a normal mode to a power-saving mode based on a time log that records the time points when operations were done.

Another print apparatus specifies the number of times of print job per time slot, and sets an elapsed time to switch from the normal mode to the power-saving mode based on the number of times of print jobs.

SUMMARY

An image forming apparatus according to one aspect of the disclosure includes an operation panel, a printing device, a storage device, a job management unit, a power-saving mode setting unit, and an operation mode control unit. The operation panel accepts user operations. The printing device executes a print job. The storage device stores job classification data that indicates a job type belonging to a first job type group and a job type belonging to a second job type group. The job management unit records the job type of an executing job and a start time point of the job execution as a job log. The power-saving mode setting unit that: (a) specifies the job log where the start time point of the job execution belongs to an identical time slot in a past for a predetermined time slot; (b1) sets the power-saving mode for the predetermined time slot to the first power-saving mode when a proportion of the number of the executing jobs where the job types of the specified job log belong to the first job type group to the number of the executing jobs where the job types of the specified job log belong to the first job type group or the second job type group exceeds a predetermined threshold value; and (b2) sets the power-saving mode for the predetermined time slot to the second power-saving mode when the proportion is equal to or less than the predetermined threshold value. The operation mode control unit causes an operation mode to be switched to the first power-saving mode or the second power-saving mode set by the power-saving mode setting unit when the operation mode is switched from a normal mode to the power-saving mode.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 2 illustrates an exemplary job classification data according to the one embodiment.

FIG. 4 illustrates one exemplary job classification data according to the one embodiment after a user has edited.

DETAILED DESCRIPTION

Figure 1:
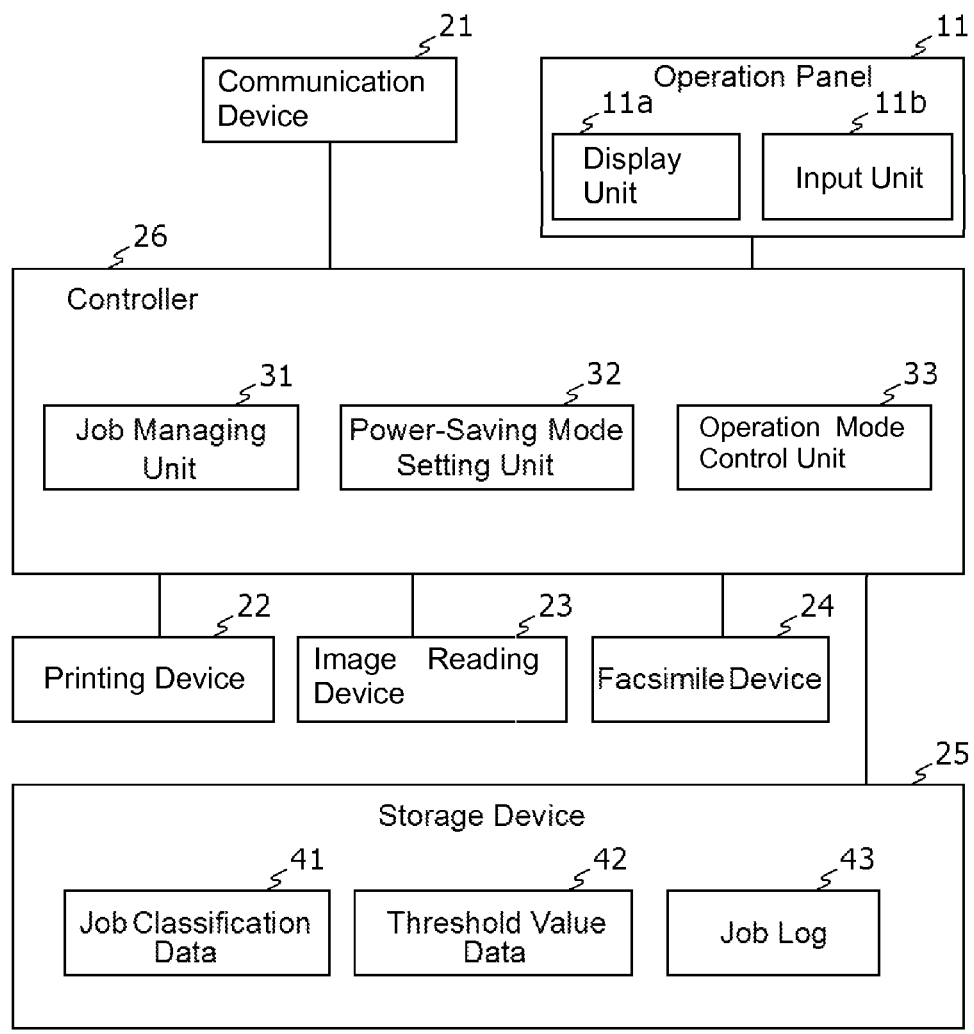
FIG. 1 illustrates a configuration of an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure based on the drawings.

FIG. 1 illustrates a configuration of an image forming apparatus according to an embodiment of the disclosure.

The image forming apparatus illustrated in FIG. 1 is a multi-functional peripheral with a printing function, an image reading function, and a facsimile function. This image forming apparatus includes an operation panel 11, a communication device 21, a printing device 22, an image reading device 23, a facsimile device 24, a storage device 25, and a controller 26.

The operation panel 11 includes a display unit 11a such as a liquid crystal display and an input unit 11b such as a touch panel. The operation panel 11 displays an operation screen for a user and detects an input operation by the user.

The communication device 21 is connectable to a host apparatus (not illustrated) over a network or a similar medium. The communication device 21 is an apparatus that performs data communications in a predetermined communication protocol. For example, the communication device 21 receives data for print job from the host apparatus.

The printing device 22 is, for example, an internal device that prints a document image on a printing paper sheet by an electrophotographic method.

The image reading device 23 is an internal device that optically reads a document image from an original document, and generates an image data of the document image.

The facsimile device 24 is an internal device having a receiving function and a transmitting function. With the receiving function, the facsimile device 24 receives a facsimile signal and converts the facsimile signal into an image data. With the transmitting function, the facsimile device 24 converts the image data into the facsimile signal and transmits the facsimile signal.

The storage device 25 is a non-volatile storage device such as a hard disk drive and a flash memory. The storage device 25 stores, for example, data and a program. The storage device 25 stores job classification data 41 and threshold value data 42.

The job classification data 41 indicates a job type belonging to a job type specified as a low-power mode (the first job type group) and a job type belonging to a job type specified as a sleep mode (the second job type group). The threshold value data 42 indicates the threshold value data described later.

The controller 26 includes a computer that includes a Central Processing Unit (CPU) (not illustrated), a Read Only Memory (ROM), a Random Access Memory (RAM), and a similar unit. The controller 26 loads programs stored on the ROM or the storage device 25 to the RAM. The CPU executes the program to operate as various processors.

In this embodiment, the controller 26 operates as a job management unit 31, a power-saving mode setting unit 32, and an operation mode control unit 33.

The Job management unit 31 executes various jobs using the internal apparatus such as the communication device 21, the printing device 22, the image reading device 23, the facsimile device 24, and the storage device 25 according to the data received from the host apparatus or a user operation to the operation panel 11. The Job management unit 31 sequentially records a job log 43 that indicates the job types of the executed job and execution start time point on the storage device 25.

The power-saving mode setting unit 32 performs the processes for the predetermined time slot as follows.

(a) The power-saving mode setting unit 32 specifies the job log 43 where the start time point of the job execution belongs to an identical time slot in a past.

(b1) The power-saving mode setting unit 32 sets the power-saving mode for the predetermined time slot to the low-power mode (the first power-saving mode) when a proportion of the number of the jobs where the job types of the specified job log 43 belong to the low-power mode specifying job type to the number of the jobs where the job types of the specified job log 43 belong to the low-power mode specifying job type or the sleep-mode designating job type exceeds a predetermined threshold value.

(b2) The power-saving mode setting unit 32 sets the power-saving mode for the predetermined time slot to the sleep mode (the second power-saving mode) when the proportion is equal to or less than the predetermined threshold value.

In the low-power mode, the electric power supply to the operation panel 11 is suspended while the electric power supply to the printing device 22 or a similar internal apparatus continues. On the other hand, in the sleep mode, the electric power supply to the operation panel 11 and the printing device 22 or a similar internal apparatus is suspended. In both modes, the electric power supply to a standby unit to resume a normal mode continues. In the low-power mode, the electric power is consumed more than that in the sleep mode while the low-power mode ensures a short recovery time compared with the sleep mode.

The power-saving mode setting unit 32 identifies the job type belonging to the low-power mode setting job type or the job type belonging to the sleep-mode setting job type based on the job classification data 41. The power-saving mode setting unit 32 identifies the above-described threshold value based on the threshold value data 42.

In the above-described predetermined time slot, when the operation mode control unit 33 switches an operation mode of the image forming apparatus from the normal mode to the power-saving mode, the operation mode control unit 33 switches the operation mode to the low-power mode or the sleep mode, which are set by the power-saving mode setting unit 32. For example, the operation mode control unit 33 performs this operation after a job completion or an elapse of a predetermined time from the job completion, or if no user operations has been made to the operation panel 11 in a normal mode during a predetermined time. When an event to resume the normal mode is input into the standby unit to resume the normal mode after the operation mode control unit 33 switches an operation mode of the image forming apparatus into the power-saving mode (the low-power mode or the sleep mode), the operation mode control unit 33 resumes from the power-saving mode to the normal mode.

Here, the job type belonging to the low-power mode setting job type is a job type that requires the user operation to the operation panel 11. The job type belonging to the sleep-mode setting job type is a job type that doesn't requires the user operation to the operation panel 11. Thus, when the job type is set, at the time slot when jobs that require the user operation to the operation panel (e.g. copy job) are performed frequently, the operation mode control unit 33 resumes not from the sleep mode to the normal mode but from the power-saving mode to the normal mode. This causes resuming the normal mode in a short time, thus shortening a waiting time for users to ensure an improved operability.

FIG. 2 illustrates one example of the job classification data 41 in FIG. 1.

For example, as illustrated in FIG. 2, a copy job, a host transmit (scan to send) job, a facsimile transmission job, and a box printing job, which prints a document in a document box, are designated as the low-power mode setting job type where the user operation to the operation panel 11 is necessary. On the other hand, a print job, which prints based on data from the host apparatus, a box storage job, which stores generated job data based on data from the host apparatus in the document box, and a facsimile reception job are specified as the sleep-mode setting job type where the user operation to the operation panel 11 is not necessary.

Next, the following describes the operation of the above-described image forming apparatus.

In this embodiment, the job management unit 31 records the job log 43 per job execution. Then, the operation mode control unit 33 switches the operation mode from the normal mode to the power-saving mode corresponding to status of the image forming apparatus, or resumes from the power-saving mode to the normal mode. When the operation mode control unit 33 switches the operation mode from the normal mode to the power-saving mode corresponding to status of the image forming apparatus, the operation mode control unit 33 switches to the low-power mode or the sleep mode, which are set by the power-saving mode setting unit 32. After that, at a predetermined timing, the power-saving mode setting unit 32 selects the power-saving mode used at the predetermined time slot from the low-power mode and the sleep mode.

Figure 3:
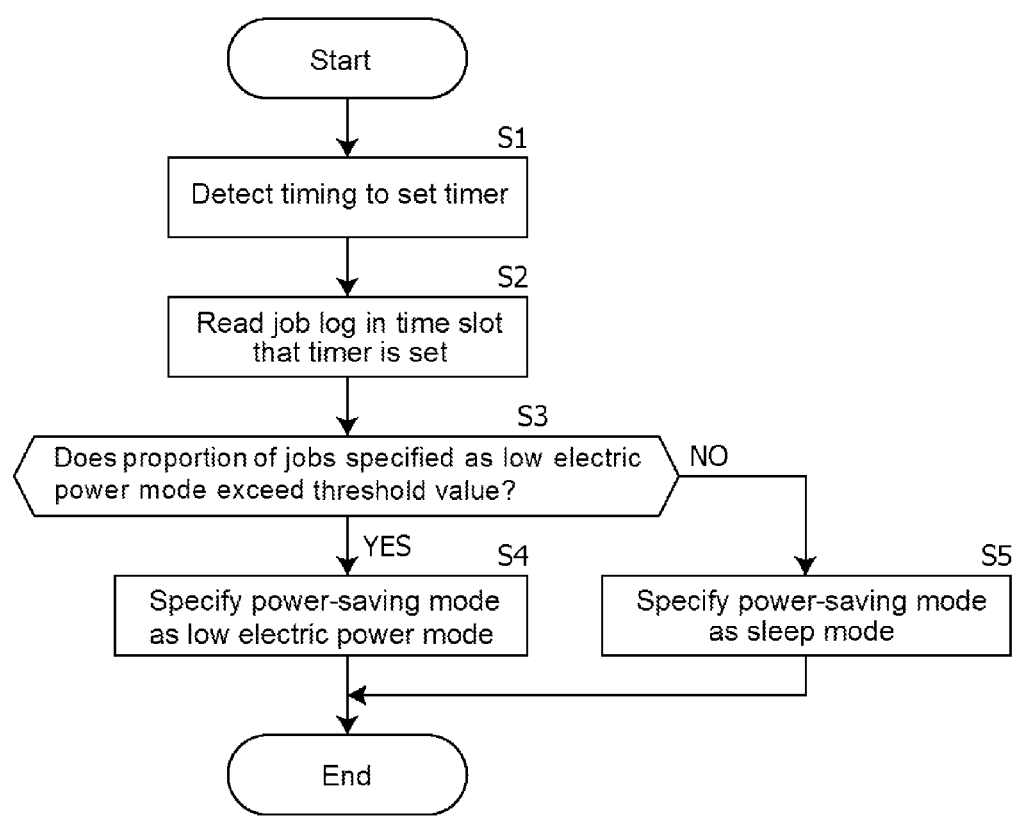
FIG. 3 illustrates operations of a power-saving mode setting unit in the image forming apparatus according to the one embodiment.

Here, the following describes the operation of the power-saving mode setting unit 32. FIG. 3 illustrates the operation of the power-saving mode setting unit 32 in the image forming apparatus in FIG. 1

When the power-saving mode setting unit 32 detects a predetermined timing of timer setting (Step S1), the power-saving mode setting unit 32 sets the power-saving mode for the predetermined time slot (Step S2 to S5).

For example, when the timing of the timer setting is set to the starting time point of one week, the time from the moment in the one week is divided into a predetermined length of the time slot (such as 30 minutes), and the power-saving mode is set by the processes from Steps S2 to S5 for each of the time slots.

When the timing of the timer setting is set to the starting time point of a day, the time from the moment in a day is divided into a predetermined length of the time (such as 30 minutes), and the power-saving mode is set by the processes from Steps S2 to S5 for each of the time slots.

The power-saving mode setting unit 32 reads all of the job log 43 having an execution start time point that belongs to a focused time slot (Step S2), and determines whether the proportion of the job of the low-power mode setting job type in the job log 43 exceeds a predetermined threshold value or not (Step S3).

Then, with respect to the time slot, when the proportion of the job of the low-power mode setting job type exceeds the predetermined threshold, the power-saving mode setting unit 32 specifies the low-power mode as the power-saving mode during the time slot (Step S4). If not so, the power-saving mode setting unit 32 specifies the sleep mode as the power-saving mode during the time slot (Step S5).

Thus, the power-saving mode for each of the time slots in a certain period (such as for one week or a day) is set, and the operation mode control unit 33 performs the set power-saving mode.

As described above, according to the embodiment, the power-saving mode setting unit 32 performs the processes during the predetermined time slot as follows.

(a) The power-saving mode setting unit 32 specifies the job log 43 where the start time point of the job execution belongs to an identical time slot in a past.

(b1) The power-saving mode setting unit 32 sets the power-saving mode for the predetermined time slot to the low-power mode when a proportion of the number of the jobs where the job types of the specified job log 43 belong to the low-power mode setting job type to the number of the jobs where the job types of the specified job log 43 belong to the low-power mode setting job type or the sleep-mode setting job type exceeds a predetermined threshold value.

(b2) The power-saving mode setting unit 32 sets the power-saving mode to the sleep mode when the proportion is equal to or less than the predetermined threshold value.

Accordingly, corresponding to the job type of a job that is executed at the identical time slot in the past, an appropriate power-saving mode is selected. Therefore, as the power-saving mode, the appropriate mode is applied among a plurality of the mode at each the time slots.

The embodiments described above are preferred examples of the disclosure. However, the disclosure is not limited to these embodiments, and various modifications and changes of the embodiments may be made without departing from the gist of the disclosure.

For example, in the above-described embodiments, the job classification data 41 may be editable (changeable) corresponding to the user operation to the operation panel 11. This allows a user to change the job type, which is often used by the user, to the low-power mode setting job type. FIG. 4 illustrates one example of the job classification data 41 after the user has edited. For example, the box storage itself does not need a user operation. Since some users may do box printing immediately after the box storage, the user can change the box storage job to the low-power mode setting job type, as illustrated in FIG. 4.

In the embodiments described above, the threshold value data 42 can be editable (changeable) corresponding to the user operation to the operation panel 11.

The disclosure, for example, is applicable to an image forming apparatus having an operation panel.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
   an operation panel that accepts user operations;
   a printing device that executes a print job;
   a storage device that stores job classification data that indicates a job type belonging to a first job type group and a job type belonging to a second job type group;
   a job management unit that records the job type of an executing job and a start time point of the job execution as a job log;
   a power-saving mode setting unit that
      (a) specifies the job log where the start time point of the job execution belongs to an identical time slot in a past for a predetermined time slot,
      (b1) sets a power-saving mode for the predetermined time slot to a first power-saving mode when a proportion of the number of the executing jobs where the job types of the specified job log belong to the first job type group to the number of the executing jobs where the job types of the specified job log belong to the first job type group or the second job type group exceeds a predetermined threshold value, and
      (b2) sets the power-saving mode for the predetermined time slot to a second power-saving mode when the proportion is equal to or less than the predetermined threshold value; and
   an operation mode control unit that causes an operation mode to be switched to the first power-saving mode or the second power-saving mode set by the power-saving mode setting unit when the operation mode is switched from a normal mode to the power-saving mode.

2. The image forming apparatus according to claim 1, wherein:
   the first power-saving mode stops supply of electric power to the operation panel, and continues supply of electric power to the printing device; and
   the second power-saving mode stops supply of electric power to the operation panel and the printing device.

3. The image forming apparatus according to claim 1, wherein:
   the job type belonging to the first job type group is a job type that requires a user operation to the operation panel; and
   the job type belonging to the second job type group is a job type that does not require a user operation to the operation panel.

4. The image forming apparatus according to claim 1, wherein:
   the storage device stores the threshold value data indicative of the threshold value;
   the power-saving mode setting unit reads the threshold value data and specifies the threshold value to use; and
   the threshold value data is editable corresponding to the user operation to the operation panel.

5. The image forming apparatus according to claim 1, wherein the image forming apparatus edits the job classification data corresponding to the user operation to the operation panel.

6. An image forming method using an operation panel that accepts user operations and a printing device that executes a print job, the image forming method comprising:
   storing job classification data that indicates a job type belonging to a first job type group and a job type belonging to a second job type group;
   recording the job type of an executing job and a start time point of the job execution as a job log;
   specifying the job log where the start time point of the job execution belongs to an identical time slot in a past for a predetermined time slot;
   setting a power-saving mode for the predetermined time slot to a first power-saving mode when a proportion of the number of the executing jobs where the job types of the specified job log belong to the first job type group to the number of the executing jobs where the job types of the specified job log belong to the first job type group or the second job type group exceeds a predetermined threshold value;

setting the power-saving mode for the predetermined time slot to a second power-saving mode when the proportion is equal to or less than the predetermined threshold value; and causing an operation mode to be switched to the first power-saving mode or the second power-saving mode set by a power-saving mode setting unit when the operation mode is switched from a normal mode to the power-saving mode.

7. A non-transitory computer-readable recording medium storing an image forming program for controlling an image forming apparatus including an operation panel that accepts user operations and a printing device that executes a print job, the image forming program causing the image forming apparatus to function as:

a storage device that stores job classification data that indicates a job type belonging to a first job type group and a job type belonging to a second job type group;

a job management unit that records the job type of an executing job and a start time point of the job execution as a job log;

a power-saving mode setting unit that
 (a) specifies the job log where the start time point of the job execution belongs to an identical time slot in a past for a predetermined time slot,
 (b1) sets a power-saving mode for the predetermined time slot to a first power-saving mode when a proportion of the number of the executing jobs where the job types of the specified job log belong to the first job type group to the number of the executing jobs where the job types of the specified job log belong to the first job type group or the second job type group exceeds a predetermined threshold value, and
 (b2) sets the power-saving mode for the predetermined time slot to a second power-saving mode when the proportion is equal to or less than the predetermined threshold value; and an operation mode control unit that causes an operation mode to be switched to the first power-saving mode or the second power-saving mode set by the power-saving mode setting unit when the operation mode is switched from a normal mode to the power-saving mode.

* * * * *